(12) United States Patent
Hecht et al.

(10) Patent No.: US 8,702,356 B2
(45) Date of Patent: Apr. 22, 2014

(54) FLUTED DRILL AND FLUTED DRILL CUTTING HEAD THEREFOR

(75) Inventors: Gil Hecht, Nahariya (IL); Danny Chen, Nahariya (IL)

(73) Assignee: Iscar, Ltd., Tefen (IL)

( * ) Notice: Subject to any disclaimer, the term of this patent is extended or adjusted under 35 U.S.C. 154(b) by 278 days.

(21) Appl. No.: 13/315,113

(22) Filed: Dec. 8, 2011

(65) Prior Publication Data

US 2012/0148358 A1 Jun. 14, 2012

(30) Foreign Application Priority Data

Dec. 12, 2010 (IL) .......................................... 209924

(51) Int. Cl.
*B23B 51/02* (2006.01)

(52) U.S. Cl.
CPC ...................................... *B23B 51/02* (2013.01)
USPC ............................ 408/226; 408/231; 408/233

(58) Field of Classification Search
CPC ..................... B23B 51/048; B23B 2231/0204; B23B 2251/02; B23B 2251/247
USPC .................................. 408/226, 230, 231, 233
See application file for complete search history.

(56) References Cited

U.S. PATENT DOCUMENTS

| | | | | |
|---|---|---|---|---|
| 1,106,966 A | * | 8/1914 | Pauli | 175/412 |
| 1,408,947 A | * | 3/1922 | Johnson | 408/201 |
| 1,603,739 A | * | 10/1926 | Borgeson | 408/229 |
| 1,964,030 A | * | 6/1934 | Brush | 175/383 |
| 2,150,189 A | * | 3/1939 | Ronneberg | 175/383 |
| 2,673,716 A | * | 3/1954 | Avery | 175/420.1 |
| 4,167,363 A | * | 9/1979 | Whitesel | 408/201 |
| 4,355,932 A | | 10/1982 | Koppelmann et al. | |
| 5,957,631 A | | 9/1999 | Hecht | |
| 6,132,146 A | * | 10/2000 | Satran et al. | 407/40 |
| 2004/0005199 A1 | * | 1/2004 | Janness | 407/35 |
| 2004/0071516 A1 | | 4/2004 | Hakenjos | |
| 2005/0254912 A1 | | 11/2005 | Skrzynski | |
| 2008/0170920 A1 | | 7/2008 | Krenzer et al. | |
| 2008/0193237 A1 | * | 8/2008 | Men et al. | 408/226 |
| 2009/0311060 A1 | | 12/2009 | Frejd | |
| 2010/0028098 A1 | * | 2/2010 | Shaffer | 408/230 |
| 2010/0202845 A1 | * | 8/2010 | Fang et al. | 408/225 |
| 2010/0322728 A1 | * | 12/2010 | Aare | 408/200 |

FOREIGN PATENT DOCUMENTS

| | | | | |
|---|---|---|---|---|
| DE | 20104257 U1 | | 9/2001 | |
| DE | 102009013580 A1 | * | 9/2013 | B23O 51/02 |
| FR | 1055570 A | | 2/1954 | |

OTHER PUBLICATIONS

Internatonal Search Report dated Feb. 1, 2012 issued in counterpart PCT Application No. PCT/IL2011/000917.

* cited by examiner

*Primary Examiner* — Daniel Howell
*Assistant Examiner* — Ryan Rufo
(74) *Attorney, Agent, or Firm* — Womble Carlyle

(57) ABSTRACT

A fluted drill has a drill body with a fluted drill cutting head removably secured thereto. The cutting head has two drilling portions facing axially opposite directions. In axial view, the cutting head has at least four through openings. Each drilling portion includes a plurality of head flute portions and a plurality of cutting head coupling portions.

28 Claims, 4 Drawing Sheets

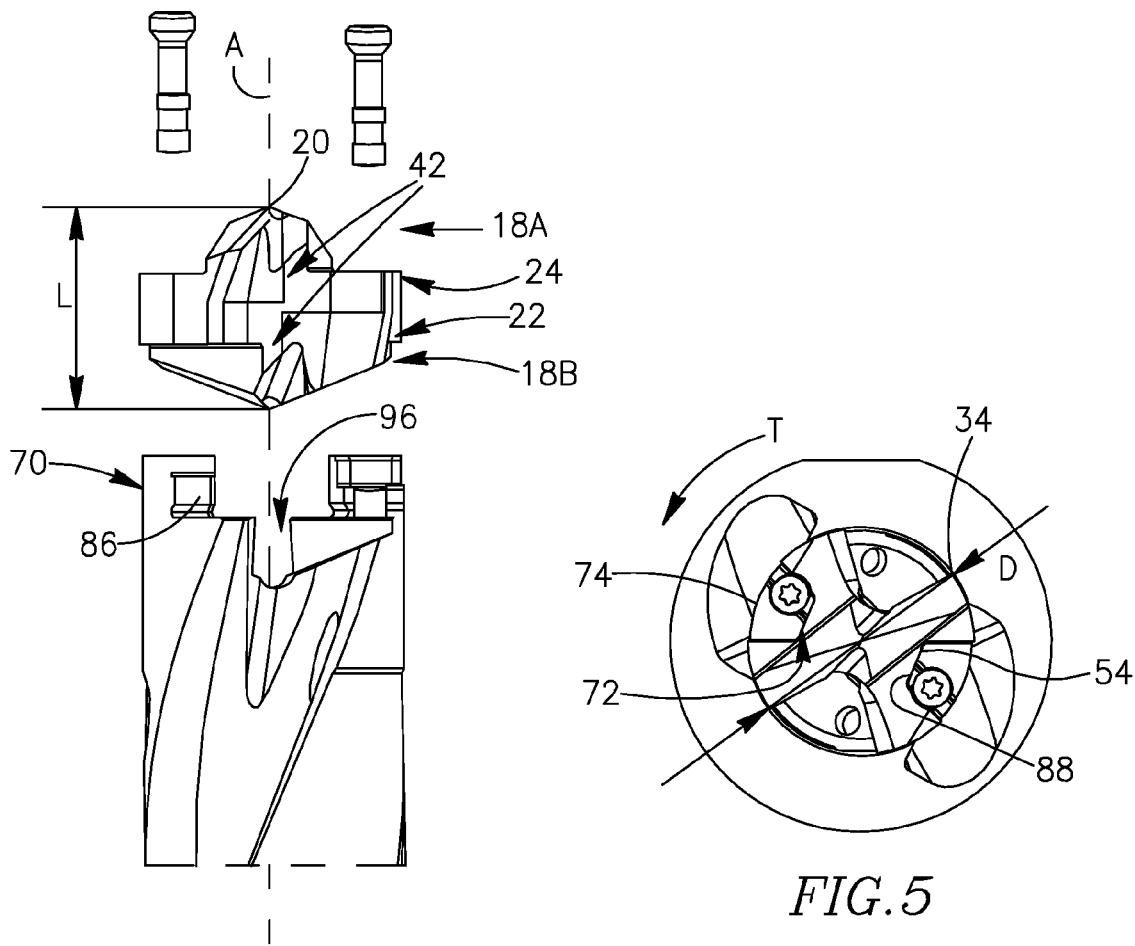
FIG.4
FIG.5
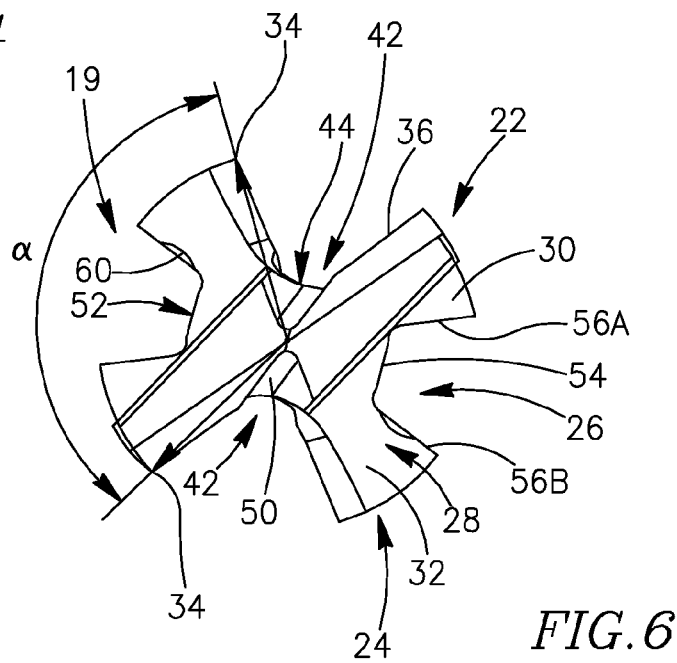
FIG.6

FLUTED DRILL AND FLUTED DRILL CUTTING HEAD THEREFOR

FIELD OF THE INVENTION

The subject matter of the present application relates to fluted drills having replaceable cutting heads.

BACKGROUND OF THE INVENTION

Fluted drills having replaceable cutting heads are disclosed, for example in U.S. Pat. No. 5,957,631. Such replaceable cutting heads allow the cutting head to be replaced when it has become worn without having to replace the entire drill thereby reducing costs and waste of material.

SUMMARY OF THE INVENTION

In accordance with the subject matter of the present application there is provided a fluted drill cutting head comprising: two drilling portions facing axially opposite directions with respect to a head rotation axis, a plurality of cutting head coupling portions and a plurality of head flute portions; wherein, in an axial view, the cutting head has at least four see-through openings. The cutting head can have an axial head length L measured along the head rotation axis between axial extremities of the cutting head and a head diameter D measured radially in a direction perpendicular to the head rotation axis between radial extremities of the cutting head. The cutting head can fulfill the condition L<2D. More precisely, the cutting head can fulfill the condition L<D. The cutting head can be devoid of a radial through hole. The cutting head have a unitary, one-piece construction. The cutting head can be devoid of releasable or moving parts. The cutting head can be devoid of cutting inserts. The cutting head can be made of cemented carbide. The cutting head can be devoid of an elongated body section disposed between the two drilling portions.

Each head flute portion of one drilling portion can merge with an associated head flute portion of the other drilling portion to form a common head flute. The head flute portions can be non-flat. The head flute portions can be concavely curved in an axial view.

Each cutting head coupling portion can comprise a cutting portion and a non-cutting portion. The cutting portion and the non-cutting portion can be adjacent to each other. Each cutting head coupling portion can have an angular extension α>10°. Each cutting head coupling portion can have at least one circumferentially facing driven surface and at least one axial abutment surface. Each cutting head coupling portion can comprise a clamping recess.

The clamping recess can comprise a driven surface and a head centering surface. The clamping recess can be located between the cutting portion and the non-cutting portion. Each clamping recess of one of the two drilling portions can merge with an associated clamping recess of the other drilling portion to form a common head clamping recess.

Each cutting portion can comprise a cutting edge formed at least partially by the intersection of an associated head flute portion and an associated relief surface. Each cutting portion of one drilling portion can merge with an associated non-cutting portion of the other drilling portion.

Each cutting portion of one of the two drilling portions can comprise a margin edge which connects with the cutting edge at a cutting corner. The margin edge can extend from the cutting corner to the associated non-cutting portion of the other drilling portion. A section of the margin edge adjacent the cutting corner can be a wiper. The margin edges can be alternately operative and non-operative margin edges. Each head flute portion can extend between an adjacent operative margin edge and an adjacent non-operative margin edge.

The non-cutting portion can be devoid of cutting edges.

A cutting head abutment surface can be located between angularly adjacent head flute portions. Each cutting head abutment surface can comprise leading and trailing abutment surface ends. The leading and trailing abutment surface ends can be located on respective adjacent cutting and non-cutting portions of the same drilling portion.

A head centering surface of the cutting head can be discontinuous. Each head centering surface can be axially located between associated opposite cutting head abutment surfaces of each drilling portion.

Each driven surface can extend from a leading abutment surface end of a cutting portion of one drilling portion, to an opposite trailing abutment surface end located on an associated non-cutting portion of the other drilling portion.

In accordance with another aspect of the subject matter of the present application, there is provided a fluted drill body having a body rotation axis, the fluted drill body comprising a clamping portion at a forward end, a shank portion extending axially rearwardly from the clamping portion and body flutes extending along the fluted drill body, the clamping portion comprising a plurality of drill body coupling portions, each drill body coupling portion comprising:

a cutting head support surface comprising leading and trailing support surface ends; and an integrally formed clamping jaw extending forwardly from the respective cutting head support surface, each clamping jaw comprising:

opposite inner and outer side surfaces;

front and back side surfaces extending between the inner and outer side surfaces;

a drive surface located on the front side surface and facing generally in a rotation direction, a body centering surface located on the inner side surface and facing inwards, towards the body rotation axis; and a pullout prevention member located adjacent a clamping jaw upper surface; the clamping portion further comprising a drilling portion housing located rearwardly of the cutting head support surfaces;

wherein the body centering surface is axially located between the pullout prevention members and the cutting head support surfaces.

Each body flute can comprise a gash located axially adjacent the drilling portion housing, formed to match a web thinning region of a reversible fluted drill cutting head.

The body centering surface can be discontinuous.

Optionally, the drilling portion housing does not engage any portion of a cutting head mounted therein.

Each leading support surface end can be located adjacent the back side surface of each respective clamping jaw.

Each trailing support surface end can be located adjacent the front side surface of each respective clamping jaw.

The pullout prevention members can be clamping screws. The pullout prevention members can be clamping jaw extensions, each of which extends transversely from the clamping jaw in the turning direction.

The body centering surface can project radially inward from the inner side surface.

In accordance still another aspect of the subject matter of the present application, there is provided a fluted drill comprising the fluted drill body and the cutting head securely clamped to the fluted drill body; wherein at least one head flute portion of the cutting head aligns with a respective body flute of the fluted drill body.

Optionally, a non-operative drilling portion is accommodated by, and does not contact, the drilling portion housing of the fluted drill body.

Each pullout prevention member of the fluted drill body can engage a respective cutting head screw support surface of the cutting head.

The head flute portions and the body flutes can be devoid of protrusions.

The fluted drill can be configured for drilling at a drilling depth which surpasses an axial length of the cutting head.

In accordance with another aspect of the subject matter of the present application, there is provided a fluted drill comprising the fluted drill body and the cutting head securely clamped in the clamping portion of the fluted drill body; wherein each cutting head coupling portion comprises:

a cutting portion and a non-cutting portion, each cutting portion comprising a cutting edge formed at least partially by the intersection of an associated head flute portion and an associated relief surface, the non-cutting portion being devoid of cutting edges, each non-cutting portion of one drilling portion merging with an associated non-cutting portion of the other drilling portion;

a clamping recesses located between an adjacent cutting portion and an adjacent non-cutting portion; the clamping recess comprising a driven surface facing opposite a turning direction of the drill and a head centering surface facing away from the head rotation axis; and a cutting head abutment surface located between angularly adjacent head flute portions; each cutting head abutment surface associated with an operative drilling portion engages a respective cutting head support surface of the clamping portion;

at least one operative driven surface engages a respective drive surface; and at least one head centering surface engages a respective body centering surface.

In accordance with still another aspect of the subject matter of the present application, there is provided a double-ended fluted drill cutting head comprising:

two drilling portions facing axially opposite directions with respect to a head rotation axis;

a plurality of cutting head coupling portions, each coupling portion having at least one circumferentially facing driven surface and also at least one axial abutment surface; and a plurality of common head flute portions.

Each coupling portion can comprise a common head clamping recess. In an end view of the cutting head, the common head clamping recesses can be circumferentially spaced apart from the common head flute portions.

Each common head flute portion can comprise: a first leading flute end and a first trailing flute end associated with a first cutting edge belonging to a first cutting end of the cutting head; and a second leading flute end and a second trailing flute end associated with a second cutting edge belonging to a second cutting end of the cutting head.

It is understood that the above-said is a summary, and that any of the aspects above can further comprise, or be further defined with, any of the features described in connection with any of the other aspects or described hereinbelow.

BRIEF DESCRIPTION OF THE DRAWINGS

For a better understanding of the subject matter of the present application and to show how the same may be carried out in practice, reference will now be made to the accompanying drawings, in which:

FIG. 4 is a side exploded view of the portion of the drill of FIG. 2;

FIG. 5 is an end view of the drill of FIG. 1;

FIG. 6 is an end view of the cutting head of FIG. 3;

Figure 1:
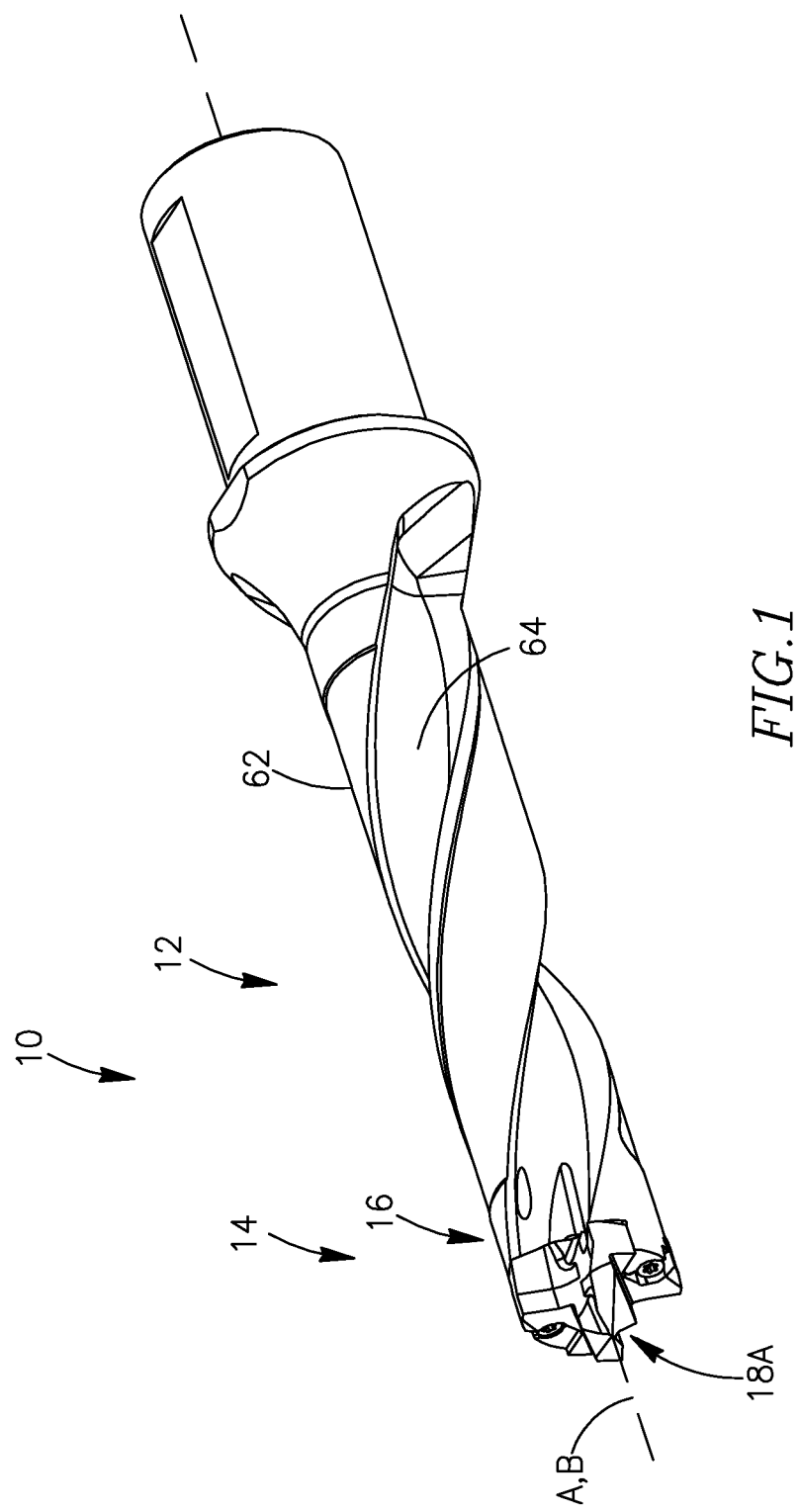
FIG. 1 is an isometric view of a fluted drill.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Reference is made to FIGS. 1 to 6. A fluted drill 10 includes a fluted drill body 12 and a fluted drill cutting head 14 mounted in a clamping portion 16 of the fluted drill body 12. The cutting head 14 has a head rotation axis A and includes, in this non-limiting example, a pair of identical drilling portions 18 (18A, 18B) located at axially opposite ends of the cutting head 14. The cutting head 14 therefore constitutes a reversible cutting head 14. According to some embodiments, each drilling portion 18 comprises a pair of diametrically disposed cutting head coupling portions 19. As will be explained below, each coupling portion 19 can have an angular extension $\alpha > 10°$. An axial head length L of the cutting head 14 is measured along the head rotation axis A between two axially outermost tips 20 of each drilling portion 18. A head diameter D is defined by radial extremities of the drilling portions 18. The head length L of the cutting head 14 can be shorter than its head diameter D, i.e., L<D. According to other embodiments, the axial length L can be longer than the head diameter D, i.e., the ratio L/D can be less than 2. The cutting head 14 therefore has a compact shape. As the cutting head 14 is reversible and has a compact shape, it can also be considered a so-called cutting insert. This relation between length and diameter of the cutting head 14 can provide radial stability for the fluted drill 10. Furthermore, it may prevent an undesired bending moment from being developed in the clamping portion 16.

When the cutting head 14 is mounted on the fluted drill body 12, one drilling portion 18 constitutes an operative drilling portion 18A, and the other drilling portion 18, which faces the drill body 12, constitutes a non-operative drilling portion 18B.

Each drilling portion 18 can include two cutting head coupling portions 19 and two head flute portions 42.

Each cutting head coupling portion 19 can include a cutting portion 22, a non-cutting portion 24, a cutting head abutment surface 28 and a clamping recess 26. The non-cutting portion 24 is devoid of cutting edges. In an axial view of the cutting head 14 (as shown in FIGS. 5 and 6), each non-cutting portion 24 can be angularly located between two cutting portions 22. Furthermore, each clamping recess 26 can be angularly located between an adjacent cutting portion 22 and an adjacent non-cutting portion 24. Stated differently, in an axial view of the cutting head 14, each head flute portion 42 is separated from each clamping recess 26. Each head flute portion 42 is separated from each clamping recess 26, by either a cutting portion 22 or a non-cutting portion 24. In an axial, or plan view, the cutting head 14 can be X-shaped. Stated differently, in a view along the head rotation axis A, the cutting head 14 can have four see-through openings which extend from one drilling portion to another. The see-through openings can be either open or closed in the radial direction. In other words, each opening opens out to both drilling portions and can open out in a general direction perpendicular to the head rotation axis A. In this non-limiting embodiment, one pair of openings is associated with the clamping recesses 26 and another pair of openings is associated with the head flute portions 42. The clamping recesses 26 are therefore separated from the head flute portion 42, in order to direct the chip flow only into the head flute portions 42. This arrangement is advantageous because cut chips can flow free-of-obstruction in the head flute portions 42, and any clamping means of the drill body is protected from the cut chips.

Figure 3:
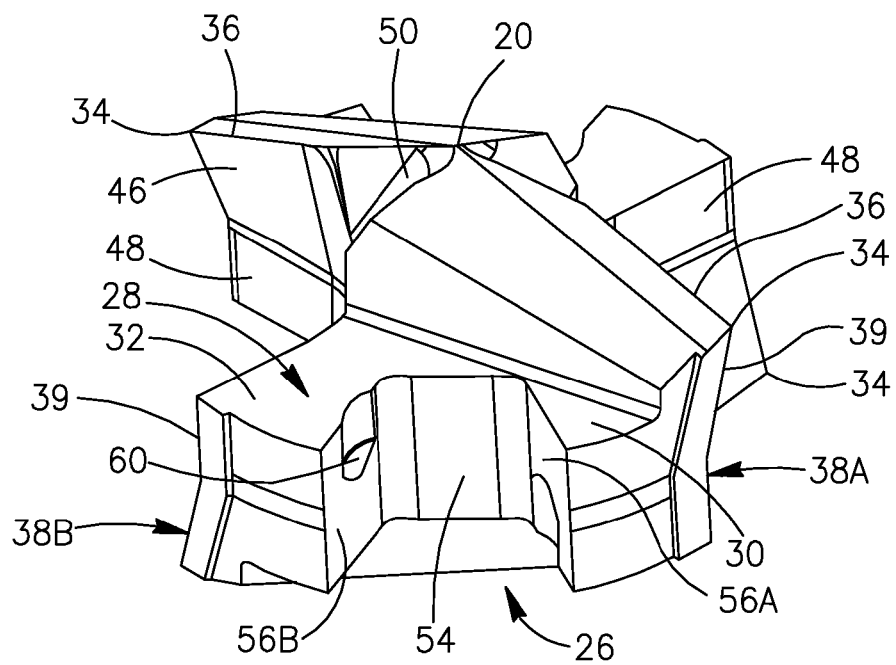
FIG. 3 an isometric view of a cutting head of the drill of FIG. 1.

In an axial view of the cutting head 14, each cutting portion 22 extends radially between the head rotation axis A and a cutting corner 34. Each cutting portion 22 can include a cutting edge 36 and a margin edge 38 (FIG. 3). A section of the margin edge 38 adjacent the cutting corner 34 can constitute a wiper 39. Depending on the orientation of the cutting head 14, the margin edge 38 can constitute an operative or a non-operative margin edge 38A, 38B. Each cutting portion 22 of one drilling portion 18 can extend in the direction of the rotation axis A. Each cutting portion 22 of one drilling portion merges with a non-cutting portion 24 of the other drilling portion 18 (as shown in FIG. 4). In accordance with some embodiments, each cutting edge 36 extends from the head rotation axis A to the cutting corner 34 of the cutting portion 22.

In an axial view of the cutting head 14, the angular extension α of each cutting head coupling portion 19 is measured between two imaginary lines perpendicular to the head rotation axis A. The first line passes through a cutting corner 34 of a cutting portion 22 of one drilling portion 18. The second line passes through a cutting corner 34 of a cutting portion 22 of the other drilling portion 18.

Figure 2:
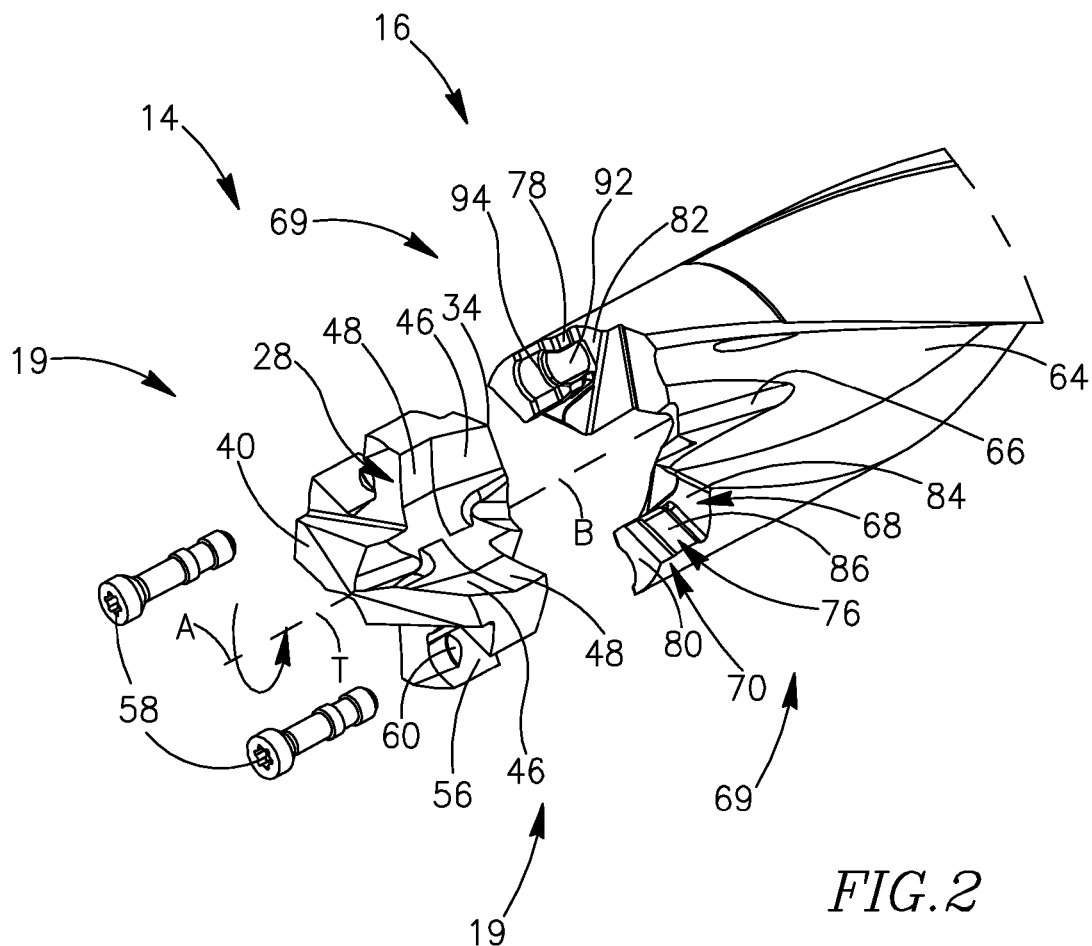
FIG. 2 is an isometric exploded view of a portion of the drill of FIG. 1.

Each drilling portion 18 can include two head flute portions 42 (as shown in FIG. 4). According to this non-limiting example, the head flute portions 42 can have a concavely curved shape, as viewed from an axial view. The curved design can help form chips for efficiently evacuating them along the flute. Each head flute portion 42 of one drilling portion 18 merges with an associated head flute portion 42 of the other drilling portion 18 to form a common head flute 44. Each head flute portion 42 extends between an adjacent operative margin edge 38A and an adjacent non-operative margin edge 38B. Each head flute portion 42 can include leading and trailing flute ends 46, 48, with respect to a direction of rotation T of the fluted drill 10 (as shown in FIGS. 2 and 5). For each drilling portion 18, the leading flute end 46 can be located on a cutting portion 22, and the trailing flute end 48 can be located on an angularly-adjacent non-cutting portion 24. The leading flute end 46 can face the rotation direction T. Each leading flute end 46 of a cutting portion 22 of one drilling portion 18 can extend from an associated cutting edge 36 and merge with an associated trailing flute end 48 of an associated non-cutting portion 24 of the other drilling portion 18. Each trailing flute end 48 can terminate at an associated trailing abutment surface end 32. Each leading flute end 46 can merge with a trailing flute end 48 of an angularly-adjacent non-cutting portion 24. In accordance with some embodiments, each head flute portion 42 is provided with a web thinning region 50. In this non-limiting example, the web thinning region 50 includes two gashes, one in each flute portion 42 (FIG. 3), adjacent each tip 20 of each drilling portion 18.

Each cutting portion 22 further includes a relief surface 40 which extends from the cutting edge 36, generally opposite to the rotation direction T. The relief surface 40 meets the head flute portion 42, at least partially, at the cutting edge 36.

When the cutting edges of the operative drilling portion 18 become worn, the cutting head 14 is reversed, and the non-operative drilling portions 18B become operative drilling portions 18A.

Each cutting head abutment surface 28 can be located between angularly adjacent head flute portions 42 of a given drilling portion 18. The cutting head abutment surfaces 28 can be perpendicular to the head rotation axis A. Each cutting head abutment surface 28 can include leading and trailing abutment surface ends 30, 32. For each drilling portion 18, each trailing abutment surface end 32 can be located on a non-cutting portion 24, and each leading abutment surface end 30 can be located on an angularly-adjacent cutting portion 22. Each trailing abutment surface end 32 associated with the operative drilling portion 18A can extend from a respective trailing flute end 48 in a direction opposite the rotation direction T, towards an associated clamping recess 26. Each leading abutment surface end 30 associated with the operative drilling portion 18A can extend from adjacent a respective relief surface 40, in the rotation direction T, towards an associated clamping recess 26.

The margin edge 38 (see FIG. 3), meets the cutting edge 36 at the cutting corner 34. The margin edge 38 is located generally along the periphery of the cutting head 14. According to some embodiments, each margin edge 38 extends from the cutting corner 34 to the non-cutting portion 24 so that it terminates at a respective trailing abutment surface end 32. According to some embodiments, each cutting portion 22 includes a single cutting edge 36, a single cutting corner 34 and a single margin edge 38.

In an axial view of the cutting head 14 along the head rotation axis A, it can be seen that by changing α, one can (depending on the application) determine, or control, an overall sector size of the common head flutes 44, at the expense of a sector size of the clamping recesses 26.

According to some embodiments, the clamping recesses 26 are common to both drilling portions 18, i.e., a clamping recess 26 of one drilling portion 18 merges with an associated clamping recess 26 of the other drilling portion 18 to form a common head clamping recess 52. Each clamping recess 26 can include a head centering surface 54 and two driven surfaces 56. The head centering surface 54 can be arched. The head centering surface 54 can be discontinuous, in the sense that it can be separated into sections. The head centering surface 54 may be located radially inwards in the cutting head 14, towards the head rotation axis A, and faces outwards therefrom. In accordance with some embodiments, the head centering surface 54 extends between each cutting and non-cutting portions 22, 24 on the same drilling portion 18. Each head centering surface 54 is axially located between respective opposite head abutment surfaces 28 of each drilling portion 18. According to some embodiments, the head centering surfaces 54 are axially located substantially midway between axial extremities of the cutting head 14. When assembled, this can minimize bending moments and aid to the drill's overall stability. In other words, with respect to the axis of rotation A, lateral, or radial centering forces will be directed as close as possible to the cutting edges, where lateral machining forces are generated, thus minimizing bending moments.

The driven surfaces 56 are separated into opposite operative and non-operative driven surfaces 56A, 56B, which alternate, in accordance with the position of the cutting head 14 in the drill body 12. In other words, each driven surface 56 becomes an operative driven surface 56A when associated with an operative drilling portion 18A, and after reversing the cutting head 14, it becomes a non-operative driven surface 56B. According to some embodiments, each operative driven surface 56A extends from a leading abutment surface end 30 associated with a non-operative drilling portion 18B, to an opposite trailing abutment surface end 32 associated with an operative drilling portion 18A. The operative driven surfaces 56A face generally opposite direction of the rotation direction T.

The drill body 12 has a body rotation axis B which defines a forward to rearward direction, and a shank portion 62 which extends rearwardly from the clamping portion 16. The drill body 12 can have two chip evacuating body flutes 64 which extend along the drill body 12 and are formed to match, and continue the shape of, the common head flutes 44 of the cutting head 14. According to some embodiments, each body flute 64 has a single gash 66 formed at a forward portion of the body flute 64. The gash 66 is formed to match, and continue the shape of, the web thinning region 50 of the respective head flute portion 42, thus allowing chips to flow freely from the head flute portion 42 to the body flute 64. The clamping portion 16 includes, according to some embodiments, two cutting head support surfaces 68. According to some embodiments, the cutting head support surfaces 68 are generally perpendicular to the body rotation axis B.

According to some embodiments the clamping portion 16 comprises two diametrically disposed drill body coupling portions 69 for coupling with the cutting head coupling portions 19 when securing the cutting head 14 to the drill body 12. Each drill body coupling portion 69 includes an integrally formed clamping jaw 70, which extends forwardly from a respective cutting head support surface 68. Each clamping jaw 70 includes inner and outer side surfaces 72, 74 and front and back side surfaces 76, 78 which extend between the inner and outer side surfaces 72, 74 and between the respective cutting head support surface 68 and a clamping jaw upper surface 80. Each cutting head support surface 68 includes leading and trailing support surface ends 82, 84. According to some embodiments, the leading support surface end 82 extends, oppositely the rotation direction T, from the back side surface 78 towards the periphery of the drill body 12. According to some embodiments, each trailing support surface end 84 extends in the rotation direction T, from an associated front side surface 76 to an associated body flute 64. In terms of resistance to bending moment (when the cutting head is assembled), this separation into leading and trailing abutment surface ends 30, 32 improves overall drill stability, by providing a distribution of abutment forces.

Each clamping jaw 70 includes a drive surface 86 which is located on the front side surface 76 and faces generally in the rotation direction T. According to some embodiments, each clamping jaw 70 further includes a body centering surface 88 which is located on the inner side surface 72 and faces generally inwardly towards the body rotation axis B. According to some embodiments, the body centering surface 88 projects radially inwards from the inner side surface 72. The body centering surface 88 can be arched. The body centering surface 88 can be discontinuous, in the sense that it can be separated into sections.

Figure 7:
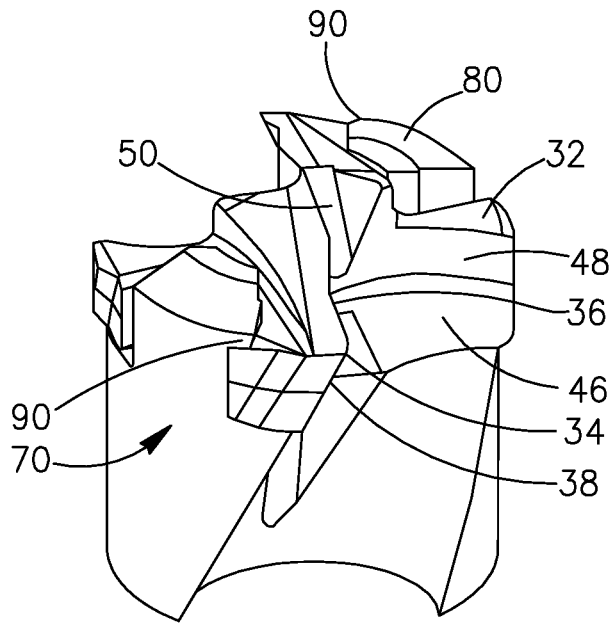
FIG. 7 is an isometric view of a portion of another drill.
Figure 8:
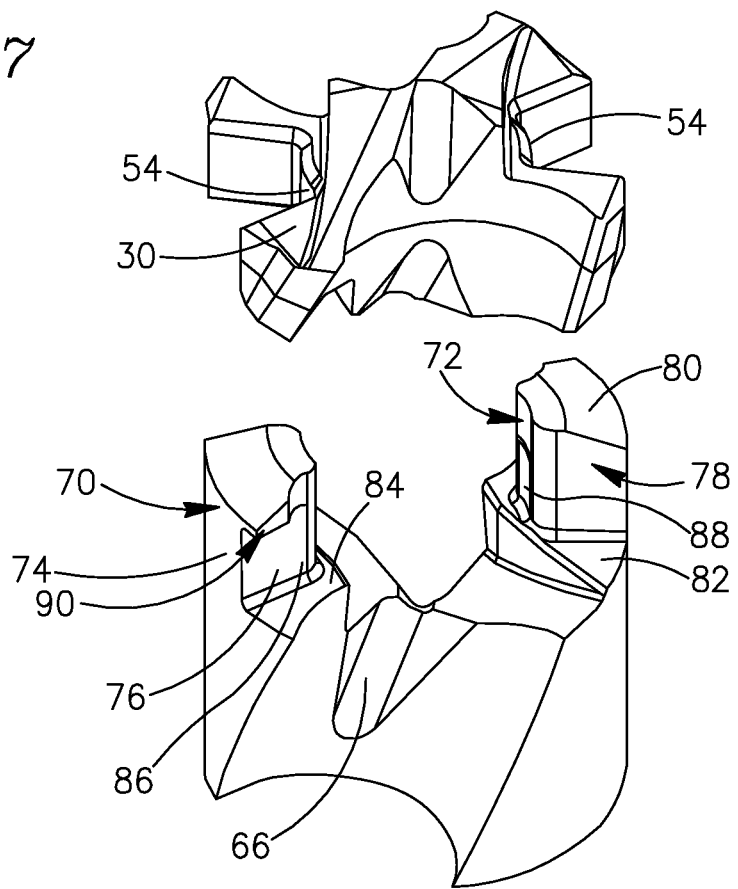
FIG. 8 is an isometric exploded view of the portion of the drill of FIG. 7.

The clamping portion 16 includes pullout prevention members. In some embodiments (shown in FIGS. 7 and 8), the pullout prevention members are clamping jaw extensions 90 which overhang the drive surface 86. According to these embodiments, each clamping jaw 70 includes one clamping jaw extension 90 which projects transversely, in the rotation direction T, from a forward-most portion of the front side surface 76 of the clamping jaw 70. The body centering surfaces 88 engage the head centering surfaces 54 with an interference fit in order to center the cutting head 14 with respect to the drill body 12. A difference between the curvature radiuses of the head and body centering surfaces 54, 88 may enable a tight friction-fit between the clamping jaws 70 and the cutting head 14. In some embodiments, after the cutting head 14 has been assembled on the drill body 12, in addition to centering the cutting head 14, the body centering surfaces 88 may have an additional role of preventing axial rotation (about axis B and against the rotation direction T) of the cutting head 14 with respect to the drill body 12.

In some embodiments, the pullout prevention members are clamping screws 58. In such embodiments, each clamping jaw 70 includes a screw bore 92 to threadingly receive the clamping screw 58. The screw bore 92 extends in a general longitudinal direction of the clamping jaw 70. Each clamping jaw 70 may further include a body screw support surface 94 for providing support for the clamping screw 58. The body screw support surface 94 forms a ledge projecting from the back side surface 78 of a respective clamping jaw 70 at a location between the clamping jaw upper surface 80 and the leading support surface end 82 of the cutting head support surface 68 from which the respective clamping jaw 70 projects.

The clamping portion 16 further includes a drilling portion housing 96, which is centered on the rotation axis B. According to some embodiments, the drilling portion housing 96 extends rearwardly from the cutting head support surfaces 68 and is formed to accommodate the non-operative drilling portion 18B of the cutting head 14. The drilling portion housing 96 does not include any surfaces formed to engage surfaces on the cutting head 14 and does not engage any portion of the cutting head 14.

In the assembled position of the fluted drill 10, the cutting head 14 is securely clamped in the clamping portion 16 of the drill body 12. The fluted drill is configured to drill at a drilling depth which surpasses the axial length L of the cutting head 14. In this position, each cutting head abutment surface 28 associated with the operative drilling portion 18A abuts a respective cutting head support surface 68 of the drill body 12. Each clamping recess 26 receives a respective clamping jaw 70, i.e. each clamping jaw 70 is located between a pair of adjacent cutting and non-cutting portions 22, 24 of a given cutting head coupling portion 19 of the operative drilling portion 18A. At least one operative driven surface 56A of each clamping recess 26 abuts a respective drive surface 86 of a respective clamping jaw 70 of the drill body 12, in order to transfer torque from the drill body 12 to the cutting head 14. In accordance with embodiments in which the pullout prevention members are clamping screws 58, each clamping screw 58 is screw threaded into a respective screw bore 92 and abuts both the cutting head screw support surface 60 of the cutting head 14, and the body screw support surface 94 of the drill body 12.

The cutting head 14 may be of the sort used in metal cutting operations and thus can be termed a metal cutting head meaning that the cutting head 14 may be used for cutting metal, not necessarily that the cutting head 14 is made of metal. In accordance with some embodiments, the cutting head 14 may be made of hard wear resistant material such as cemented carbide, and the drill body 12 may be made of steel or of another metal or metal compound. In accordance with some embodiments, the cutting head 14 may be made of a hard wear resistant material such as cemented carbide, and the drill body 12 may also be made of a hard wear resistant material such as cemented carbide. The cutting head 14 can have a unitary one-piece construction. Stated differently, the cutting head 14 can be devoid of mechanical parts such as inserts. The cutting head can be devoid of radial through holes, oriented generally perpendicularly to the head rotation axis A. The cutting head can be devoid of an elongated body section. In particular, the cutting head 14 can be devoid of an elongated body section disposed between the two drilling portions. The cutting head 14 can be made of a core material, and can be at least partially coated by at least another material. The core material can be cemented carbide or a like material.

As previously disclosed, the cutting head 14 is designed with head flute portions 42. As a result, initially, cut chips only hit the head flute portions 42. The cutting head 14 therefore protects the clamping portion 16 of the drill body 12 from being worn by cut chips.

The description above includes exemplary embodiments and details for enablement, if needed, of claimed subject matter, and does not exclude non-exemplified embodiments and details from the claim scope of the present application.

The invention claimed is:

1. A fluted drill cutting head (14) comprising:
two drilling portions (18A, 18B) facing axially opposite directions with respect to a head rotation axis (A),
a plurality of cutting head coupling portions (19) and
a plurality of head flute portions (42);
wherein,
in an axial view, the cutting head (14) has at least four see-through openings;
each cutting head coupling portion (19) comprises a clamping recess (26), a cutting portion (22) and a non-cutting portion (24);
the clamping recess (26) is located between the cutting portion (22) and the non-cutting portion (24); and
a periphery of the clamping recess (26) is devoid of cutting edges.

2. The cutting head (14) according to claim 1, wherein the cutting head (14) is devoid of a radial through hole.

3. The cutting head (14) according to claim 1, wherein each head flute portion (42) of one drilling portion (18) merges with an associated head flute portion (42) of the other drilling portion (18) to form a common head flute (44).

4. The cutting head (14) according to claim 1, wherein the head flute portions (42) are non-flat.

5. The cutting head (14) according to claim 1, wherein the head flute portions (42) are concavely curved in an axial view.

6. The cutting head (14) according to claim 1, wherein each cutting head coupling portion (19) has an angular extension $\alpha > 10°$.

7. The cutting head (14) according to claim 1, wherein the cutting head (14) has an axial head length L measured along the head rotation axis (A) between axial extremities of the cutting head (14) and a head diameter D measured radially in a direction perpendicular to the head rotation axis (A) between radial extremities of the cutting head (14), and wherein $L < 2D$.

8. The cutting head (14) according to claim 1, wherein the cutting head (14) has an axial head length L measured along the head rotation axis (A) between axial extremities of the cutting head (14) and a head diameter D measured radially in a direction perpendicular to the head rotation axis (A) between radial extremities of the cutting head (14), and wherein $L < D$.

9. The cutting head (14) according to claim 1, wherein the non-cutting portion (24) is devoid of cutting edges.

10. The cutting head (14) according to claim 1, wherein each clamping recess (26) of one of the two drilling portions (18) merges with an associated clamping recess (26) of the other drilling portion (18) to form a common head clamping recess (52).

11. The cutting head (14) according to claim 1, wherein:
each cutting portion comprises a cutting edge (36) formed at least partially by the intersection of an associated head flute portion (42) and an associated relief surface (40),
the non-cutting portion (24) is devoid of cutting edges,
each cutting portion (22) of one drilling portion (18) merges with an associated non-cutting portion (24) of the other drilling portion (18);
the clamping recess (26) comprises a driven surface (56) and a head centering surface (54); and
a cutting head abutment surface (28) is located between angularly adjacent head flute portions (42).

12. The cutting head (14) according to claim 11, wherein each head centering surface (54) is axially located between associated opposite cutting head abutment surfaces (28) of each drilling portion (18).

13. The cutting head (14) according to claim 1, wherein each coupling portion has at least one circumferentially facing driven surface (56A, 56B) and at least one axial abutment surface (28).

14. The cutting head (14) according to claim 1, wherein the cutting head (14) has a unitary, one-piece construction.

15. The cutting head (14) according to claim 1, wherein the cutting head (14) is devoid of releasable or moving parts.

16. The cutting head (14) according to claim 1, wherein the cutting head (14) is devoid of an elongated body section disposed between the two drilling portions (18A, 18B).

17. The cutting head (14) according to claim 1,
wherein in an end view of the cutting head (14), the head clamping recesses (52) are circumferentially spaced apart from the head flute portions (44).

18. A fluted drill (10) comprising:
a fluted drill body (12) having a body rotation axis (B), a clamping portion (16) at a forward end, a shank portion (62) extending axially rearwardly from the clamping portion (16) and body flutes (64) extending along the fluted drill body (12); and
the cutting head (14) according to claim 1 securely clamped to the fluted drill body (12); wherein at least one head flute portion (42) of the cutting head (14) aligns with a respective body flute (64) of the fluted drill body (12).

19. The fluted drill (10) according to claim 18, wherein the clamping portion (16) of the fluted drill body (12) comprises a plurality of drill body coupling portions (69), each drill body coupling portion (69) comprising:
a cutting head support surface (68) comprising leading and trailing support surface ends (82, 84); and
an integrally formed clamping jaw (70) extending forwardly from the respective cutting head support surface (68), each clamping jaw (70) comprising:
opposite inner and outer side surfaces (72, 74);
front and back side surfaces (76, 78) extending between the inner and outer side surfaces (72, 74);
a drive surface (86) located on the front side surface (76) and facing generally in a rotation direction (T), a body centering surface (88) located on the inner side surface (72) and facing inwards, towards the body rotation axis (B); and a pullout prevention member (58, 90) located adjacent a clamping jaw upper surface (80);

the clamping portion (16) further comprising a drilling portion housing (96) located rearwardly of the cutting head support surfaces (68);

wherein the body centering surface (88) is axially located between the pullout prevention members (58, 90) and the cutting head support surfaces (68).

20. The fluted drill (10) according to claim 19, wherein each body flute (64) comprises a gash (66) located axially adjacent the drilling portion housing (96), formed to match a web thinning region (50) of a reversible cutting head (14).

21. The fluted drill (10) according to claim 19, wherein the drilling portion housing (96) does not engage any portion of a cutting head (14) mounted therein.

22. The fluted drill (10) according to claim 19, wherein the pullout prevention members are clamping screws (58).

23. The fluted drill (10) according to claim 19, wherein the pullout prevention members are clamping jaw extensions (90), each of which extends transversely from the clamping jaw (70) in the turning direction (T).

24. The fluted drill (10) according to claim 19, wherein the body centering surface (88) projects radially inwards from the inner side surface (72).

25. The fluted drill (10) according to claim 19, wherein a non-operative drilling portion (18B) is accommodated by, and does not contact, the drilling portion housing (96) of the fluted drill body (12).

26. The fluted drill (10) according to claim 19, wherein each pullout prevention member (58, 90) of the fluted drill body (12) engages a respective cutting head screw support surface (60) of the cutting head (14).

27. The fluted drill (10) according to claim 19, wherein the head flute portions (42) and the body flutes (64) are devoid of protrusions.

28. The fluted drill (10) according to claim 19, wherein the fluted drill (10) is configured for drilling at a drilling depth which surpasses an axial length (L) of the cutting head (14).

* * * * *